United States Patent [19]

Visos et al.

[11] 4,372,290
[45] Feb. 8, 1983

[54] GAS BURNER HEAD WITH MEANS FOR EVACUATING TRAPPED WATER CONDENSATE

[75] Inventors: Charles D. Visos, Manchester; James M. Ferguson, St. Louis, both of Mo.

[73] Assignee: Emerson Electric Co., St. Louis, Mo.

[21] Appl. No.: 184,197

[22] Filed: Sep. 5, 1980

[51] Int. Cl.³ .............................................. F24H 1/10
[52] U.S. Cl. ..................................... 126/355; 126/359
[58] Field of Search ............... 126/355, 39 E, 51, 359, 126/361, 391, 390; 122/17, 115, 45; 239/104, 120, 121; 431/119

[56] References Cited

U.S. PATENT DOCUMENTS 844,131 2/1907 Humphrey ........................... 126/359
3,124,108 3/1964 Wenczl ................................ 122/17

FOREIGN PATENT DOCUMENTS 7632479 6/1978 France ................................ 126/355

Primary Examiner—Samuel Scott
Assistant Examiner—Randall L. Green
Attorney, Agent, or Firm—Paul A. Becker, Sr.

[57] ABSTRACT

A generally concave-shaped gas burner head is provided with circumferentially spaced means on the periphery of top and bottom portions for enabling water accumulated therein due to condensation of water vapor to flow out of the burner head without interfering with the burner flame at outlet ports on the periphery of the burner head. In one embodiment, the burner head is provided with a plurality of openings in a peripheral portion of the top portion which cooperate with a plurality of grooves in a downwardly sloping peripheral portion of the bottom portion. In another embodiment, a plurality of tabs in a peripheral portion of the top portion cooperate with a plurality of arcuate openings in a generally flat peripheral portion of the bottom portion.

1 Claim, 6 Drawing Figures

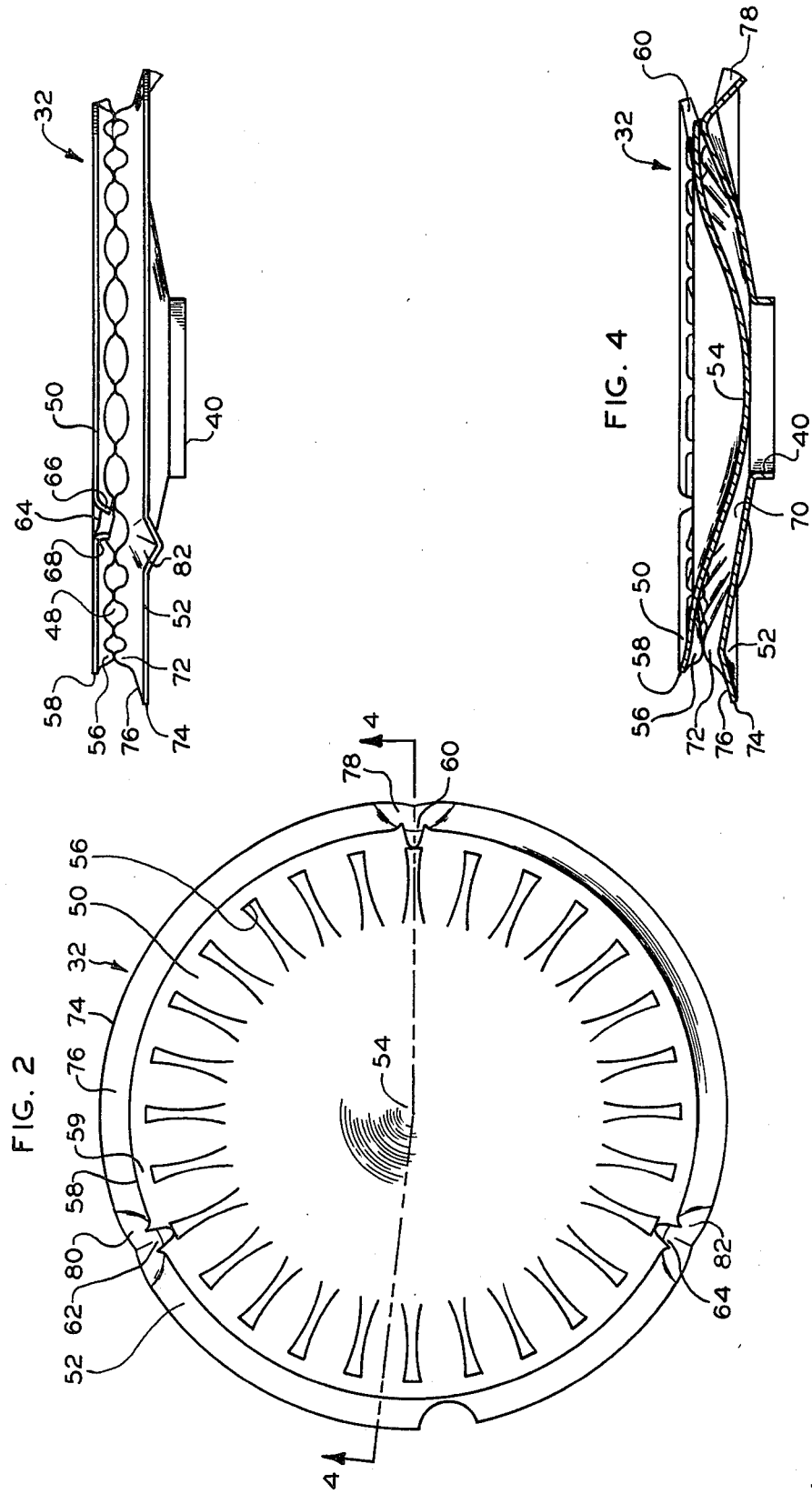

GAS BURNER HEAD WITH MEANS FOR EVACUATING TRAPPED WATER CONDENSATE

BACKGROUND OF THE INVENTION

This invention relates to gas burners, and particularly to gas burner head construction.

Most of the gas burners for currently produced domestic water heaters incorporate a burner head comprising two concave portions secured together. While such heads may differ in some details, generally, a bottom concave portion is centrally apertured to receive a gas-air mixture, the space between the bottom concave portion and a top concave portion provides a venturi, and the peripheral edges of both portions are constructed so as to provide a plurality of outlet ports therebetween for the gas-air mixture. The burner head is usually positioned in axial alignment with the flue portion of the water heater. Such a position enables effective heating of the bottom surface of the water-containing tank and facilitates the exhausting, through the flue portion, of the products of combustion.

The constant demand for improved efficiency of operation of water heaters has generated various changes in construction of the water heater tank. One particularly popular efficiency-improving construction has been the addition of baffling means in the flue portion. Such baffling means slows down the rate at which the hot flue gases are permitted to exhaust. This results in increased heat transfer from the hot flue gases to the walls of the flue portion. Since the outside walls of the flue portion are in contact with the water to be heated, such baffling means thus increases the over-all efficiency of the water heater in that more of the energy content of the burner flame is utilized to heat the water.

Such baffling means, however, also reduces the temperature of the flue gases. Since the flue gases contain water vapor, a sufficiently low flue gas temperature will cause the water vapor to condense on the interior walls of the flue portion. Condensate then creeps downwardly along the flue portion and drips onto the axially aligned burner head. Since the burner head is concave, water accumulates therein. After sufficient water has accumulated, it begins to creep over the peripheral edge of the top concave portion and into the outlet ports, causing the burner flame to be distorted or even extinguished at one or more outlet ports.

SUMMARY OF THE INVENTION

It is, therefore, an object of this invention to provide a generally new and improved gas burner head incorporating means for enabling water accumulated therein to drain therefrom without adversely affecting the burner flame.

A further object of this invention is to provide a gas burner head wherein adjacent portions of the periphery of a top and a bottom portion are modified at a plurality of circumferentially spaced intervals so that accumulated water in the top portion can drain therefrom without adversely affecting the burner flame.

These and other objects and advantages will appear from the following description when read in connection with the accompanying drawings.

BRIEF DESCRIPTION OF THE DRAWINGS

FIG. 2 is a top plan view of the burner head utilized in the gas burner of FIG. 1;

FIG. 3 is a front elevational view of the burner head of FIG. 2;

FIG. 4 is a cross-sectional view taken along line 4—4 of FIG. 2;

DESCRIPTION OF THE PREFERRED EMBODIMENT

Figure 1:
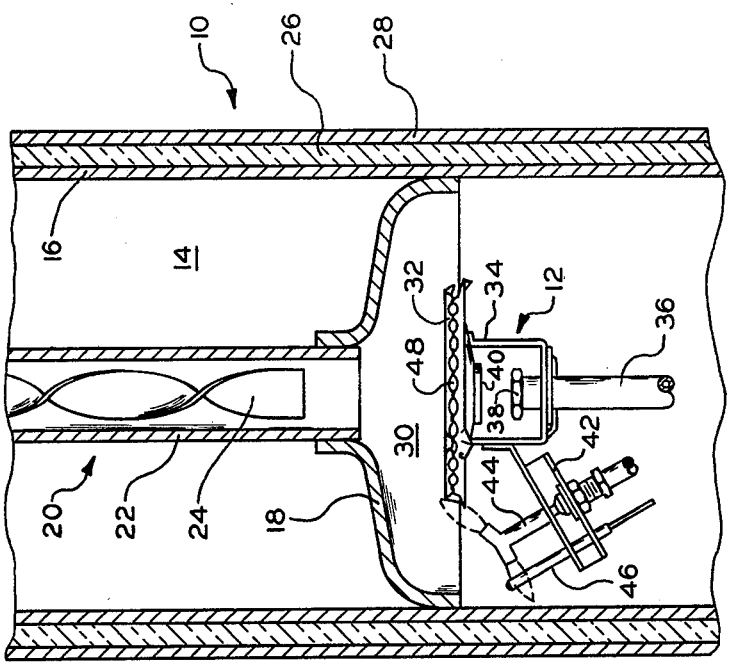
FIG. 1 is an elevational sectional view showing a gas burner of this invention in its mounting position in a domestic water heater.

Referring to FIG. 1, a water heater comprises a tank indicated generally at 10 and a burner assembly indicated generally at 12.

Water to be heated is contained in a chamber 14 defined by a cylindrical inner side wall 16, a dome-shaped bottom wall 18, a flue portion 20 extending upwardly and centrally located in tank 10, and an enclosing top portion (not shown). Flue portion 20 is comprised of a cylindrical portion 22 and a spirally-wound, sheet metal, baffle plate 24 spaced from the interior wall of cylindrical portion 22 and attached to the top portion of the tank 10. A layer of insulation 26 is sandwiched between inner side wall 16 and an outer casing 28.

Burner assembly 12 is located in a combustion chamber 30 below bottom wall 18 and includes a burner head 32 positioned in axial alignment with flue portion 20. Burner head 32 is supported by a U-shaped bracket 34 to which a gas supply conduit 36 is attached. A gas-metering orifice 38 is secured to one end of conduit 36. A centrally formed aperture 40 in a lower portion of burner head 32 is spaced from orifice 38 and is provided with a combustible air-gas mixture, the gas supply being provided through orifice 38 and the air supply being provided by ambient air.

Attached to bracket 34 by another bracket 42 is a conventional pilot burner 44 and thermocouple 46. Pilot burner 44 is effective to provide a flame for energizing thermocouple 46 and a flame for igniting the air-gas mixture discharged at burner head 32 through a plurality of outlet ports 48 on the periphery thereof.

Referring now to FIGS. 2, 3, and 4, burner head 32 comprises a metal-stamped top portion 50 and a metal-stamped bottom portion 52, both portions 50 and 52 being circular and the diameter of top portion 50 being slightly less than the diameter of bottom portion 52.

Top portion 50 is concave-shaped and includes an imperforate, smooth-surfaced, central portion 54 and a corrugated portion comprising a plurality of circumferentially spaced depressions 56 which originate at central portion 54 and terminate a slight distance radially inwardly of the outermost peripheral edge 58 of top portion 50. Depressions 56 extend downwardly towards bottom portion 52 and terminate in a plane somewhat lower than the plane on which they originate.

A peripheral portion 59 of top portion 50 extending from peripheral edge 58 to the termination of a depression 56 is cut at three circumferentially spaced positions, and metal on both sides of each cut is bent downwardly to provide openings 60, 62, and 64, each such shear-formed opening having side walls 66 and 68.

Bottom portion 52 of burner head 32, as previously described, has a centrally formed aperture 40. Extending radially outwardly from aperture 40 is a smooth-surfaced central portion 70 and a corrugated portion comprising a plurality of circumferentially spaced depressions 72 extending upwardly toward top portion 50. Depressions 72 on bottom portion 52 and depressions 56 on top portion 50 are spot-welded together so as to define the outlet ports 48.

Extending radially outwardly from depressions 72 to the outermost peripheral edge 74 of bottom portion 52 is a ledge or lip portion 76. While central portion 70 and the corrugated portion with depressions 72 provide a generally concave surface, lip portion 76 slopes downwardly.

Lip 76 is modified at three circumferentially spaced positions, indicated in FIG. 2, to provide grooves 78, 80, and 82 which extend downwardly and outwardly to peripheral edge 74. The grooves 78, 80, and 82 in lip 76 are located directly beneath the openings 60, 62, and 64, respectively, of top portion 50.

When burner flame exists at outlet ports 48, the flame heats bottom wall 18 of heater 10, thus heating the water in chamber 14. The water is also heated by the hot flue gases which exit upwardly through the flue portion 20. Specifically, the interior walls of cylindrical portion 22 of flue portion 20 are heated by the flue gases and heat is transferred therethrough to the water in chamber 14. Spirally-wound baffle plate 24 of flue portion 20 provides a tortuous path for the hot flue gases, slowing down the rate at which the flue gases are exhausted and thus resulting in more heat being transferred from the hot flue gases to the interior walls of cylindrical portion 22 and thus to the water in chamber 14. The increased heat transfer causes the temperature of the flue gases to decrease.

The flue gases, which are the products of combustion, comprise, among other components, water vapor. When the temperature difference between the water vapor component and the interior walls of cylindrical portion 20 becomes sufficiently small, the water vapor condenses. The condensate or water then creeps downwardly along the interior walls of cylindrical portion 20 and drips into the top portion 50 of burner head 32, and begins to accumulate therein.

Before the water level in top portion 50 can reach peripheral edge 58 thereof, the water begins to flow out of top portion 50 through one or more of the shear-formed openings 60, 62, and 64. Water is thus prevented from creeping over peripheral edge 58 and into outlet ports 48, an action which would distort or even extinguish the burner flame at outlet ports 48.

Because of the grooves 78, 80, and 82 in lip 76, the resulting water flow is directed downwardly from bottom portion 52 of burner head 32. Water is thus prevented from adhering to lip 76 and thus prevented from flowing into outlet ports 48 or distorting or extinguishing the burner flame due to water build-up on lip 76 near outlet ports 48.

It is noted that it is preferable to utilize at least three cooperating openings 60, 62, and 64 in top portion 50 and grooves 78, 80, and 82 in bottom portion 52 so as to allow for an unlevel mounting of burner head 32. In those applications where level mounting or a predetermined position of unlevel mounting of burner head 32 is assured, one cooperating opening and groove may suffice.

Figure 5:
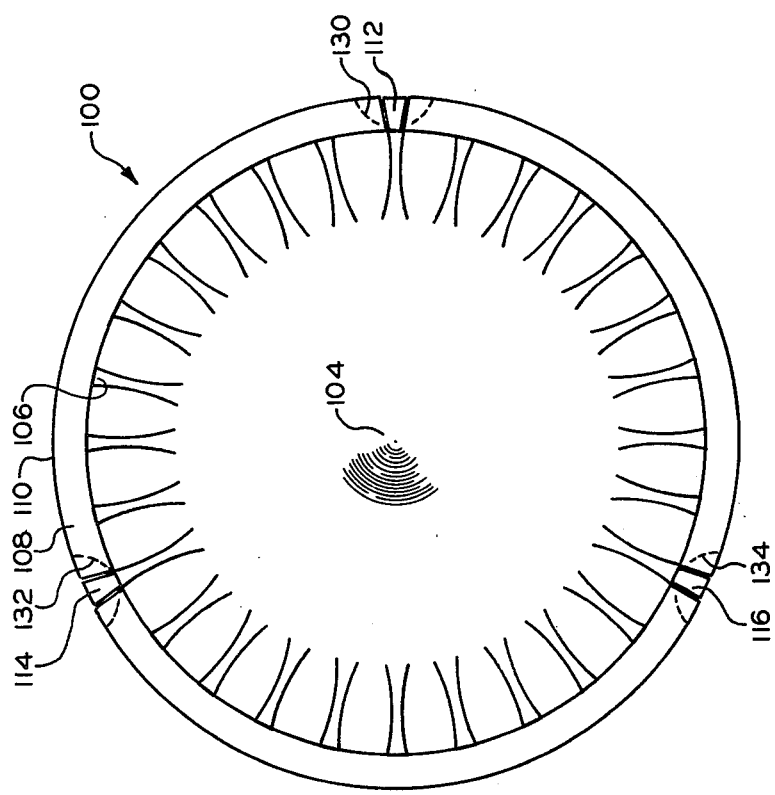
FIG. 5 is a top plan view of an alternate construction of a burner head.
Figure 6:
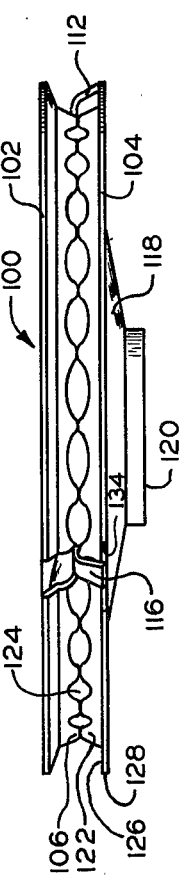
FIG. 6 is a front elevational view of the burner head of FIG. 5.

Referring now to FIGS. 5 and 6, an alternately-constructed burner head 100 comprises a top portion 102 and a bottom portion 104 of the same diameter. Top portion 102, similar to previously described top portion 50 of burner head 32, has a generally concave shape, and includes an imperforate, smooth-surfaced, central portion 104, a corrugated portion with a plurality of depressions 106, and a peripheral portion 108 extending outwardly from depressions 106 to peripheral edge 110. Peripheral portion 108 is cut at three circumferentially spaced positions to provide tabs 112, 114, and 116 which are subsequently bent downwardly as shown in FIG. 6.

Bottom portion 104 is similar to previously described bottom portion 52 of burner head 32 in that bottom portion 104 includes a smooth-surfaced, central portion 118 having an aperature 120, a plurality of depressions 122 in a corrugated portion which cooperate with depressions 106 in top portion 102 to define a plurality of outlet ports 124, and a lip portion 126 extending from depressions 122 to the peripheral edge 128 of bottom portion 104. However, unlike lip 76 of bottom portion 52 of burner head 32, lip 126 is generally flat rather than sloping downwardly.

A small segment of lip 126 is removed between peripheral edge 128 and depressions 122 at three circumferentially spaced positions to provide arcuate openings 130, 132, and 134. The openings 130, 132, and 134 are located directly beneath shear-formed tabs 112, 114, and 116, respectively, of top portion 102 and are sufficiently large so the bent-down tabs do not touch lip 126.

Before sufficient water can accumulate in top portion 102 to cause the water to creep over peripheral edge 110 thereof, the water flows out of top portion 102 along one or more of the tabs 112, 114, and 116. Since openings 130, 132, and 134 are spaced from tabs 112, 114, and 116, respectively, the water flow along the tabs does not contact lip 126. Thus, water is prevented from adhering to lip 126 and from entering outlet ports 124.

While the invention has been illustrated and described in detail in the drawings and foregoing description, it will be recognized that many changes and modifications will occur to those skilled in the art. It is therefore intended, by the appended claims, to cover any such changes and modifications as fall within the true spirit and scope of the invention.

We claim:

1. In a gas burner head wherein the burner head includes a generally concave circular top portion having a central portion, a peripheral portion, and a corrugated portion therebetween comprising a plurality of circumferentially spaced depressions; wherein the burner head further includes a circular bottom portion having a central portion, a peripheral portion, and a corrugated portion therebetween comprising a plurality of circumferentially spaced depressions; wherein the depressions of the top and bottom portions cooperate to define a plurality of outlet ports for a burner flame; wherein the burner head is positioned below and in axial alignment with the flue of a water heater; and wherein the burner head is susceptible to water dripping into the top portion thereof and accumulating therein, the water being caused by condensation of the water vapor content of the flue gas on the walls of the flue, the improvement comprising means formed by cutting of the peripheral portion of the top portion at one or more of the depressions therein for enabling the accumulated water to flow out of said top portion, and means in the peripheral portion of the bottom portion which cooperate with said means in said peripheral portion of said top portion for preventing said flow of water from adhering to said bottom portion, whereby the burner flame at the outlet ports is not adversely affected by said flow of water, wherein said means formed by cutting of said peripheral portion of said top portion comprises one or more tabs bent downwardly, wherein the diameters of said top portion and said bottom portion are the same, wherein said peripheral portion of said bottom portion comprises a generally flat portion, and wherein said means in said peripheral portion of said bottom portion comprises one or more openings, each said opening being located directly beneath each said tab and spaced therefrom.

* * * * *